(12) United States Patent
Morgante et al.

(10) Patent No.: US 11,569,698 B2
(45) Date of Patent: Jan. 31, 2023

(54) ELECTRIC MOTOR AND STATOR COOLING APPARATUS

(71) Applicant: American Axle & Manufacturing, Inc., Detroit, MI (US)

(72) Inventors: John Morgante, Sterling Heights, MI (US); James P. Downs, South Lyon, MI (US); David Crecelius, Cicero, IN (US); Peter Fischer, Fishers, IN (US); Jeffrey J. Ronning, Grosse Pointe Farms, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 126 days.

(21) Appl. No.: 17/128,281

(22) Filed: Dec. 21, 2020

(65) Prior Publication Data

US 2021/0184517 A1 Jun. 17, 2021

Related U.S. Application Data

(63) Continuation of application No. 15/820,934, filed on Nov. 22, 2017, now Pat. No. 10,879,749.

(51) Int. Cl.
*H02K 1/20* (2006.01)
*H02K 3/24* (2006.01)
*H02K 5/20* (2006.01)
*H02K 9/19* (2006.01)

(52) U.S. Cl.
CPC ............... *H02K 1/20* (2013.01); *H02K 3/24* (2013.01); *H02K 5/203* (2021.01); *H02K 9/19* (2013.01)

(58) Field of Classification Search
CPC .. H02K 1/20; H02K 3/24; H02K 5/20; H02K 9/19; H02K 9/197; H02K 5/203; H02K 11/25
USPC ....................................... 310/43, 54
See application file for complete search history.

(56) References Cited

U.S. PATENT DOCUMENTS

| | | | |
|---|---|---|---|
| 3,060,335 A * | 10/1962 | Greenwald | H02K 9/19 310/58 |
| 4,709,180 A | 11/1987 | Denk | |
| 6,081,056 A * | 6/2000 | Takagi | H02K 5/08 310/43 |
| 7,530,156 B2 | 5/2009 | Rippel et al. | |
| 7,839,031 B2 | 11/2010 | Tilton et al. | |
| 8,138,640 B2 | 3/2012 | Urano et al. | |

(Continued)

FOREIGN PATENT DOCUMENTS

DE 3134080 A1 4/1983

*Primary Examiner* — Ahmed Elnakib
(74) *Attorney, Agent, or Firm* — Burris Law, PLLC

(57) ABSTRACT

An electric motor can include a stator body defining fluid channels extending axially for fluid communication between axial ends of the stator body. Conductive windings can form first loops extending axially outward from the first end of the stator body and second loops extending axially outward from the second end of the stator body. A first cap can be coupled to the first end of the stator body and can include a first wall. The first wall can be between the first loops and the channels. Pins can extend from a side of the first wall that is opposite the first loops. The second cap can be coupled to the second end of the stator body and include a second wall. The second wall can be between the second loops and the channels. Pins can extend from a side of the second wall that is opposite the second loops.

25 Claims, 5 Drawing Sheets

(56) References Cited

U.S. PATENT DOCUMENTS

| | | |
|---|---|---|
| 8,247,933 B2 | 8/2012 | Dang et al. |
| 8,525,375 B2 | 9/2013 | Pal |
| 9,362,788 B2 | 6/2016 | Shoykhet |
| 9,419,479 B2 | 8/2016 | Shoykhet et al. |
| 9,748,822 B2 | 8/2017 | Pal |
| 10,008,907 B2 | 6/2018 | Hanumalagutti et al. |
| 2006/0026820 A1* | 2/2006 | Rippel .................... H02K 1/20 336/122 |
| 2010/0038981 A1 | 2/2010 | Urano et al. |
| 2011/0215660 A1 | 9/2011 | Goto et al. |
| 2017/0271951 A1 | 9/2017 | Hanumalagutti et al. |
| 2017/0271954 A1 | 9/2017 | Hanumalagutti et al. |
| 2017/0271955 A1 | 9/2017 | Hanumalagutti et al. |
| 2019/0157923 A1 | 5/2019 | Morgante et al. |
| 2019/0173332 A1 | 6/2019 | Ronning et al. |

* cited by examiner

ELECTRIC MOTOR AND STATOR COOLING APPARATUS

CROSS-REFERENCE TO RELATED APPLICATIONS

This application is a continuation of U.S. application Ser. No. 15/820,934 filed Nov. 22, 2017, the disclosure of which is incorporated by reference as if fully set forth in detail herein.

FIELD

The present disclosure relates to an electric motor and a stator cooling apparatus for an electric motor.

BACKGROUND

Electric motors, such as those used in vehicle drivelines, can generate heat during operation. Excess temperatures can have undesirable effects on performance and longevity of the electric motor and its associated components. As such, it can be advantageous to provide cooling to the motor to remove excess heat therefrom. While typical motor cooling methods can be sufficient for their intended uses, there continues to be a need for improved cooling of electric motors.

SUMMARY

This section provides a general summary of the disclosure, and is not a comprehensive disclosure of its full scope or all of its features.

In one form, the present disclosure provides an electric motor can include a stator body, a rotor, a plurality of electrically conductive windings, a first end cap, and a second end cap. The stator body can be disposed about an axis and can define a plurality of fluid channels. The fluid channels can extend axially through the stator body to provide fluid communication between a first axial end of the stator body and a second axial end of the stator body. The rotor can be disposed about the axis and rotatable relative to the stator body. The plurality of electrically conductive windings can form a plurality of first winding loops and a plurality of second winding loops. The first winding loops can extend axially outward from the first axial end of the stator body. The second winding loops can extend axially outward from the second axial end of the stator body. The first end cap can be coupled to the first axial end of the stator body. The first end cap can include a first wall and a plurality of first pins. The first wall can be disposed between the first winding loops and the fluid channels. The first pins can extend from a side of the first wall that is opposite the first winding loops. The second end cap can be coupled to the second axial end of the stator body. The second end cap can include a second wall and a plurality of second pins. The second wall can be disposed between the second winding loops and the fluid channels. The second pins can extend from a side of the second wall that is opposite the second winding loops.

According to a further embodiment, the electric motor can further include a housing disposed about the stator body. The housing can cooperate with the stator body and the first end cap to define a first chamber in fluid communication with the fluid channels. The first pins can extend into the first chamber. The housing can cooperate with the stator body and the second end cap to define a second chamber in fluid communication with the fluid channels. The second pins can extend into the second chamber.

In another form, the present disclosure provides an electric motor having a stator body, a rotor, a plurality of electrically conductive windings, a first end cap, a housing and a shroud. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall and a plurality of first pins. The first wall is disposed between the first winding loops and the fluid channels. The first pins extend from a side of the first wall that is opposite the first winding loops. The housing disposed about the stator body. The housing cooperates with the stator body and the first end cap to define a first chamber that is in fluid communication with the fluid channels. The first pins extend into the first chamber. The shroud is disposed about the axis between the first end cap and the housing and is configured to guide fluid flow from the first chamber across the first pins to the fluid channels.

In yet another form, the present disclosure provides an electric motor that includes a stator body, a rotor, a plurality of electrically conductive windings, and a first end cap. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall and a plurality of first pins. The first wall is disposed between the first winding loops and the fluid channels. The first pins extend from a side of the first wall that is opposite the first winding loops. The first pins extend radially outward from the first wall. The first pins extend radially outward of a radially inward-most part of the fluid channels.

In still another form, the present disclosure provides an electric motor that includes a stator body, a rotor, a plurality of electrically conductive windings, and a first end cap. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall and a plurality of first pins. The first wall is disposed between the first winding loops and the fluid channels. The first pins extend from a side of the first wall that is opposite the first winding loops. The first pins extend radially outward from the first wall. The first pins extend radially outward of a radially inward-most part of the fluid channels.

In another form, the present disclosure provides an electric motor that includes a stator body, a rotor, a plurality of electrically conductive windings, a first end cap and a sensor. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body. The first end cap includes a first wall that is disposed between the first winding loops and the fluid channels. The first wall defines a sensor bore. The sensor is received in the sensor bore and is configured to sense a temperature of the electrically conducting windings and responsively output a temperature sensor signal.

In yet another form, the present disclosure provides an electric motor that includes a stator body, a rotor, a plurality of electrically conductive windings, and a first end cap. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall and a plurality of first pins. The first wall is disposed between the first winding loops and the fluid channels. The first pins extend from a side of the first wall that is opposite the first winding loops. The first winding loops extend radially outward of a radially inward-most part of the fluid channels. The first wall includes a first annular body. The first pins extend axially from the first annular body in a direction toward the stator body.

In still another form, the present disclosure provides an electric motor that includes a stator body, a rotor, a plurality of electrically conductive windings, and a first end cap. The stator body is disposed about an axis and defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall and a plurality of first pins. The first wall is disposed between the first winding loops and the fluid channels. The first pins extend from a side of the first wall that is opposite the first winding loops. The first winding loops extend radially outward of a radially inward-most part of the fluid channels. The first wall includes a first annular body and a second annular body that is coupled to the first annular body to define a first winding cavity. The first winding loops are disposed within the first winding cavity.

In another form, the present disclosure provides an electric motor that includes a housing, a stator body, a rotor, a plurality of electrically conductive windings, and a first end cap. The stator body is disposed about an axis. The stator body defines a plurality of fluid channels that extend axially through the stator body to provide fluid communication between a first axial end of the stator body and a second axial end of the stator body. The rotor is disposed about the axis and is rotatable relative to the stator body. The electrically conductive windings form a plurality of first winding loops that extend axially outward from the first axial end of the stator body. The first end cap is coupled to the first axial end of the stator body and includes a first wall. The first end cap and the housing define a first fluid cavity that is in fluid communication with the fluid channels. The first end cap defines a first winding cavity that is separated from the first fluid cavity by the first wall. The first winding loops are disposed within the first winding cavity.

According to a further embodiment, the electric motor can further include a pump including an inlet and outlet. The inlet of the pump can be in fluid communication with the second chamber to receive fluid therefrom. The outlet of the pump can be in fluid communication with the first chamber to pump fluid thereto.

According to a further embodiment, the electric motor can further include a at least one shroud that includes at least one of: a first shroud disposed about the axis between the first end cap and the housing and configured to guide fluid flow from the first chamber across the first pins to the fluid channels; or a second shroud disposed about the axis between the second end cap and the housing and configured to guide fluid flow from the fluid channels across the second pins to the second chamber.

According to a further embodiment, the first pins can extend radially outward from the first wall.

According to a further embodiment, the first pins can extend radially outward of a radially inward-most part of the fluid channels.

According to a further embodiment, the second pins can extend radially outward from the second wall.

According to a further embodiment, the second pins can extend radially outward of a radially inward-most part of the fluid channels.

According to a further embodiment, the electric motor can further include a sensor and at least one of the first end cap or the second end cap can define a sensor bore. The sensor can be removably disposed within the sensor bore and configured to output a signal that corresponds to a temperature of the electrically conducting windings.

According to a further embodiment, the first and second winding loops can be encased in a thermally conductive but electrically insulating resin that contacts the first and second walls and the first and second winding loops.

According to a further embodiment, the first and second winding loops can extend radially outward of a radially inward-most part of the fluid channels.

According to a further embodiment, the first wall can include a first annular body and a second annular body coupled to the first annular body to define a first winding cavity. The first winding loops can be disposed within the first winding cavity. The first pins can extend axially from at least one of: the first annular body in a direction toward the stator body, or the second annular body in a direction away from the stator body.

According to a further embodiment, the first pins can extend axially in the direction toward the stator body from the first annular body and axially in the direction away from the stator body from the second annular body.

According to a further embodiment, the second wall can include a third annular body and a fourth annular body coupled to the third annular body to define a second winding cavity. The second winding loops can be disposed within the second winding cavity. The second pins can extend axially from at least one of: the third annular body in a direction toward the stator body, or the second annular body in a direction away from the stator body.

According to a further embodiment, the second pins can extend axially in the direction toward the stator body from the third annular body and axially in the direction away from the stator body from the fourth annular body.

In another form, the present disclosure provides an electric motor including a housing, a stator body, a rotor, a plurality of electrically conductive windings, a first end cap, and a second end cap. The stator body can be disposed about an axis. The stator body can define a plurality of fluid channels that extend axially through the stator body to provide fluid communication between a first axial end of the stator body and a second axial end of the stator body. The rotor can be disposed about the axis and rotatable relative to the stator body. The plurality of electrically conductive windings can form a plurality of first winding loops and a plurality of second winding loops. The first winding loops can extend axially outward from the first axial end of the stator body. The second winding loops can extend axially outward from the second axial end of the stator body. The first end cap can be coupled to the first axial end of the stator body. The first end cap can include a first wall and a plurality of first pins. The first end cap and the housing can define a first fluid cavity in fluid communication with the fluid channels. The first end cap can define a first winding cavity separated from the first fluid cavity by the first wall. The first winding loops can be disposed within the first winding cavity. The first pins can extend from the first wall into the first fluid cavity. The second end cap can be coupled to the second axial end of the stator body. The second end cap can include a second wall and a plurality of second pins. The second end cap and the housing can define a second fluid cavity in fluid communication with the fluid channels. The second end cap can define a second winding cavity separated from the second fluid cavity by the second wall. The second winding loops can be disposed within the second winding cavity. The second pins can extend from the second wall into the second fluid cavity.

According to a further embodiment, the first pins can extend radially outward from the first wall and the second pins can extend radially outward from the second wall.

According to a further embodiment, the first and second pins can extend radially outward of a radially inward-most part of the fluid channels.

According to a further embodiment, the first and second winding loops can be encased in a thermally conductive but electrically insulating resin that contacts the first and second walls and the first and second winding loops.

According to a further embodiment, the first and second winding loops can extend radially outward of a radially inward-most part of the fluid channels.

According to a further embodiment, the first wall can include a first annular body and a second annular body coupled to the first annular body to define the first winding cavity. The first pins can extend axially from at least one of: the first annular body in a direction toward the stator body, or the second annular body in a direction away from the stator body. The second wall can include a third annular body and a fourth annular body coupled to the third annular body to define the second winding cavity. The second pins can extend axially from at least one of: the third annular body in a direction toward the stator body, or the second annular body in a direction away from the stator body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
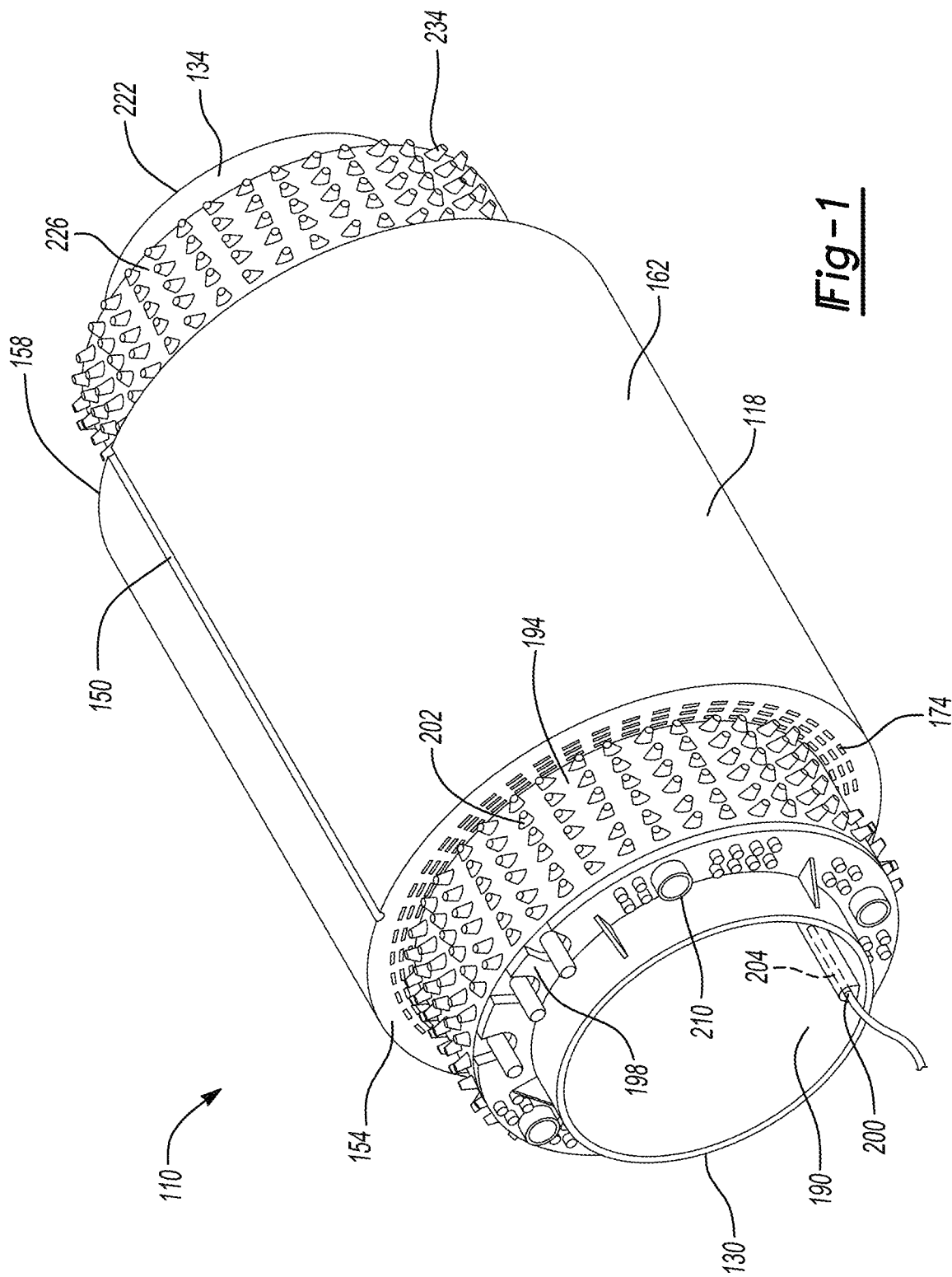
FIG. 1 is a perspective view of a portion of an electric motor of a first construction, constructed in accordance with the teachings of the present disclosure.
Figure 2:
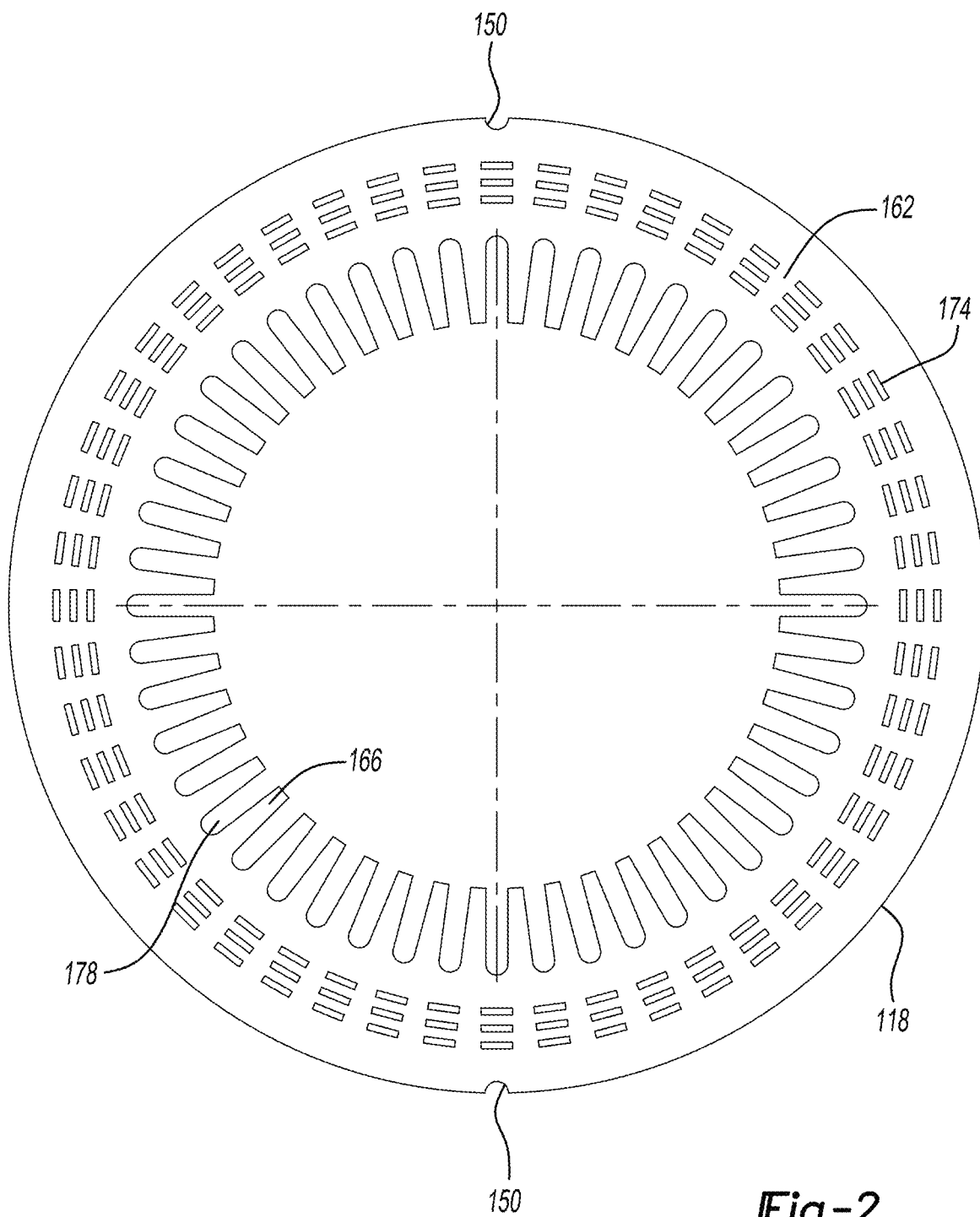
FIG. 2 is a sectional view of a stator core of the electric motor of FIG. 1.
Figure 3:
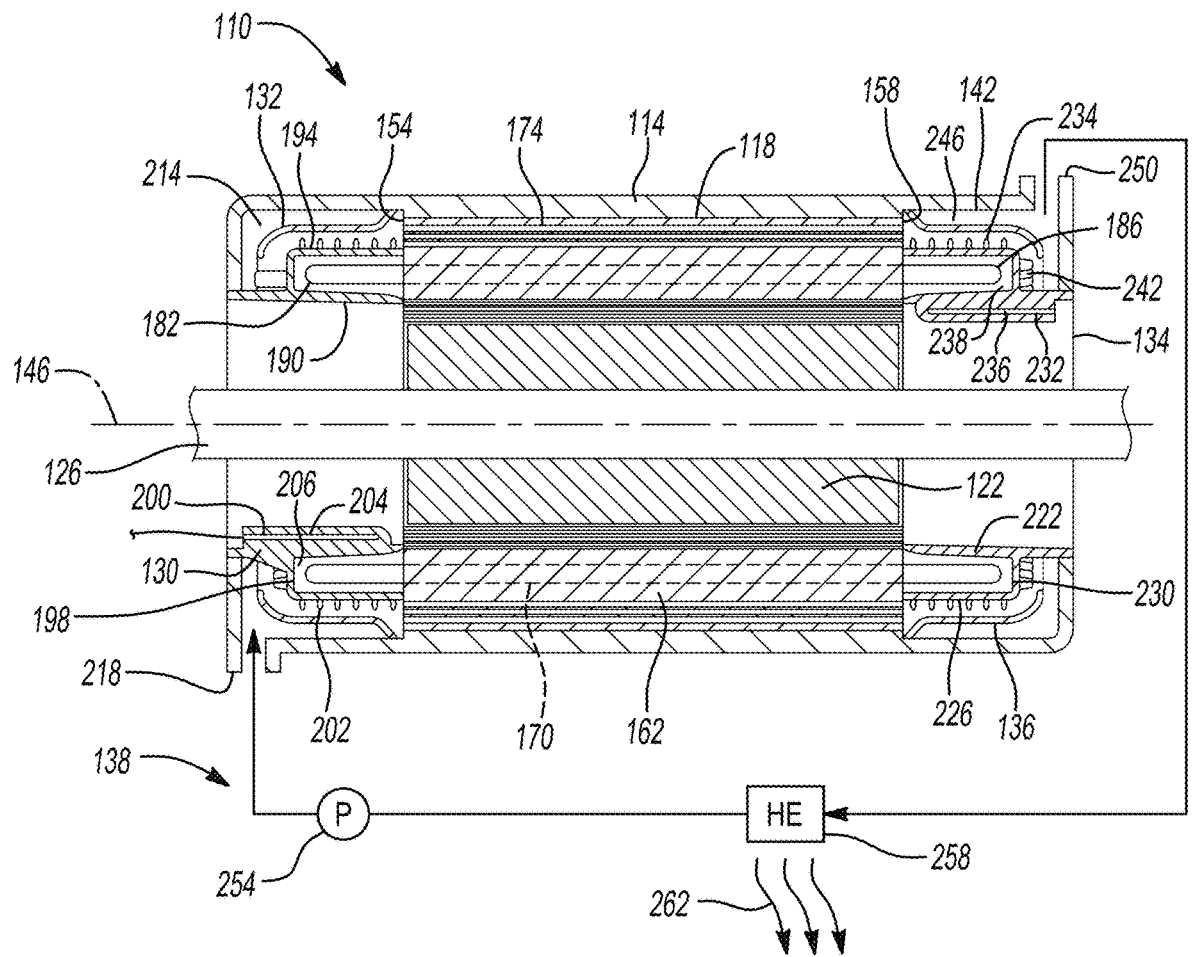
FIG. 3 is a schematic sectional view of a portion of the electric motor of FIG. 1, schematically illustrating a cooling circuit for cooling the electric motor.

With reference to FIGS. 1-3, an electric motor 110 of a first construction is illustrated. The electric motor 110 can include a housing 114, a stator 118, a rotor 122, an output shaft 126, a first end cap 130, a first shroud 132, a second end cap 134, a second shroud 136, and a cooling system 138. In the example provided, the housing 114 can define a generally cylindrical cavity 142 disposed about an axis 146. The stator 118 can be disposed about the axis 146 within the cylindrical cavity 142 and can be fixedly coupled to the housing 114 such that the stator 118 is non-rotatable relative to the housing 114. In the example provided, an outermost cylindrical surface of the stator 118 can include one or more grooves 150 that can extend axially along the stator 118 and can mate with a spline (not specifically shown) on an interior surface of the housing 114, though other configurations can be used. The stator 118 can be formed of a plurality of stator laminations stacked axially end to end along the axis 146, though other configurations can be used.

The stator 118 can be generally annular in shape, with a first axial face or end 154 and a second axial face or end 158 opposite the first axial end 154. The stator 118 can include an annular body 162, a plurality of winding poles 166, and a plurality of wire windings 170. The annular body 162 can be fixedly coupled to the winding poles 166 to make up the stator core. The annular body 162 can define a plurality of fluid fluid channels 174 that can be open at the first axial end 154 and the second axial end 158 and can extend axially therebetween to permit fluid communication between the first axial end 154 and the second axial end 158. The fluid channels 174 can be disposed about the axis 146. In the example provided, the fluid channels 174 are equally spaced apart in the circumferential direction about the axis 146.

The winding poles 166 can extend radially inward from the radially inward side of the annular body 162. The winding poles 166 can be equally spaced apart in the circumferential direction about the axis 146 to define winding slots 178 between adjacent ones of the winding poles 166. Thus, the winding poles 166 and winding slots 178 can be radially inward of the fluid channels 174. Electrically conductive wire can extend through the winding slots 178 and be wound about the winding poles 166 to form the wire windings 170 in a manner such that a first section of the wire windings 170 forms first winding loops 182 that extend axially outward from the first axial end 154 of the stator 118 and a second section of the wire windings 170 forms second winding loops 186 that extend axially outward from the second axial end 158 of the stator 118.

The rotor 122 can be disposed about the axis 146 and can be supported for rotation relative to the stator 118. The stator 118 can be disposed about the rotor 122 such that the rotor 122 is radially inward of the winding poles 166. The output shaft 126 can be disposed about the axis 146 and fixedly coupled to the rotor 122 for common rotation about the axis 146. In the example provided, the output shaft 126 can extend axially from both axial ends of the rotor 122. While not specifically shown, the output shaft 126 can be coupled to a driveline of a vehicle for providing torque to a set of vehicle wheels.

The first end cap 130 can be a generally annular body and can include a first inner wall 190, a first outer wall 194, a first end wall 198, and a plurality of first fins or pins 202. In the example provided, the first end cap 130 is unitarily formed from a thermally conductive, but electrically insulating material, such as by injection molding of a plastic for example. A proximal end of the first inner wall 190 can abut the first axial end 154 of the stator 118. The first inner wall 190 can extend axially from the first axial end 154 of the stator 118 to a distal end of the first inner wall 190. The first inner wall 190 can be coaxial with the axis 146. An outward facing cylindrical side of the first inner wall 190 can be disposed radially inward of the first winding loops 182 and an inward facing cylindrical side of the first inner wall 190 can be radially outward of the rotor 122.

The first inner wall 190 can define a pocket 200 configured to receive a temperature sensor 204. In the example provided, the pocket 200 extends generally axially relative to the axis 146 and is open facing axially away from the first axial end 154. The pocket 200 can be radially inward of the first winding loops 182 and can extend axially toward the first axial end 154 such that the temperature sensor 204 therein can be in close proximity to the first winding loops 182. For example, the temperature sensor 204 can axially overlap with the first winding loops 182. In the example provided, the temperature sensor 204 is a thermistor, though other types of sensors can be used. Thus, pocket 200 and temperature sensor 204 can be located at a back (e.g., radially inner) plane of the first winding loops 182 such that they are away from the cooling flow, but in strong thermal conduction with the first winding loops 182 to provide accurate temperature readings of the first winding loops 182. The temperature sensor 204 can be removably coupled to the pocket 200, such as being threaded into the pocket 200 for example.

A proximal end of the first outer wall 194 can abut the first axial end 154 of the stator 118. The first outer wall 194 can extend axially from the first axial end 154 of the stator 118 to a distal end of the first outer wall 194. The first outer wall 194 can be coaxial with the axis 146. In the example provided, the first outer wall 194 can be generally parallel to the first inner wall 190. An outward facing cylindrical side of the first outer wall 194 can be disposed radially inward of the fluid channels 174 and an inward facing cylindrical side of the first outer wall 194 can be disposed radially outward of the first winding loops 182.

The first end wall 198 can extend generally radially between the distal end of the first outer wall 194 and the first inner wall 190. In the example provided, the first end wall 198 connects the distal end of the first outer wall 194 to the first inner wall 190 at a location on the first inner wall 190 that is axially between the proximal and distal ends of the first inner wall 190. In the example provided, the first end wall 198 can be generally perpendicular to the axis 146, though other configurations can be used. The first inner wall 190, the first outer wall 194, and the first end wall 198 can cooperate to define a first winding cavity 206 that is disposed annularly about the axis 146 and open toward the stator 118 and configured to receive the first winding loops 182 therein. As such, the first winding cavity 206 can be open to the slots 178 of the stator 118. In the example provided, the first end wall 198 can include one or more first ports 210 that can be open axially through the first end wall 198.

A proximal end of each first pin 202 can be fixedly coupled to the first outer wall 194 and each first pin 202 can extend radially outward from the first outer wall 194 to a distal end. In the example provided, the distal ends of the first pins 202 can be radially outward of a radially innermost part of the openings of the fluid channels 174. In the example provided, the first pins 202 can be equally spaced in the circumferential direction about the first outer wall 194, though other configurations can be used. In the example provided, the first outer wall 194 includes six equally spaced rows of the first pins 202 in the axial direction, though more or fewer rows can be used, or the first pins can be such that they are not arranged in ordered rows. In the example provided, some of the first pins 202 also extend axially outward (i.e., the direction away from the stator 118) from the first end wall 198. In the example provided, the first pins 202 are generally cylindrical or conical in shape, but other configurations can be used, such as fins, ribs, blades, tabs, or pyramid-shapes for example.

The first axial end 154 of the stator 118, the inner surface of the housing 114, and the first outer wall 194 can cooperate to define a first chamber or fluid cavity 214 in fluid communication with the fluid channels 174. In the example provided, the first chamber 214 is also defined by the first end wall 198 and the portion of the first inner wall 190 that is axially outward of the first end wall 198, though other configurations can be used. Thus, the first pins 202 can extend within the first chamber 214. In the example provided, the housing 114 defines an inlet port 218 in fluid communication with the first chamber 214.

The first shroud 132 can be a hollow, generally cylindrical body disposed about the axis 146 and open at both axial ends of the first shroud 132. The first shroud 132 can be fixedly coupled to the stator 118 or the housing 114. The first shroud 132 can be generally between the first end cap 130 and the housing 114 to divide the first chamber 214 into an outer region and an inner region. The inner region can be open to the fluid channels 174, i.e., in direct fluid communication with the fluid channels 174. In other words, fluid flowing from the outer region to the fluid channels 174 must pass through the inner region. A radially inward surface of the first shroud 132 can be in close proximity to the distal ends of the first pins 202 such that fluid flowing through the inner region to the fluid channels 174 is guided across the first pins 202 and maintains a high velocity while passing between the first pins 202.

The second end cap 134 can be similar to the first end cap 130 except as otherwise shown or described herein. The second end cap 134 can be a generally annular body and can include a second inner wall 222, a second outer wall 226, a second end wall 230, and a plurality of second fins or pins 234. In the example provided, the second end cap 134 is unitarily formed from a thermally conductive, but electrically insulating material, such as by injection molding of a plastic for example. A proximal end of the second inner wall 222 can abut the second axial end 158 of the stator 118. The second inner wall 222 can extend axially from the second axial end 158 of the stator 118 to a distal end of the second inner wall 222. The second inner wall 222 can be coaxial with the axis 146. An outward facing cylindrical side of the second inner wall 222 can be disposed radially inward of the second winding loops 186 and an inward facing cylindrical side of the second inner wall 222 can be radially outward of the rotor 122.

The second inner wall 222 can optionally define a second pocket 232 configured to receive a second temperature sensor 236. The second pocket 232 and second temperature sensor 236 can be similar to the pocket 200 and temperature sensor 204 except as otherwise shown or described herein. In the example provided, the second pocket 232 extends generally axially relative to the axis 146 and is open facing axially away from the second axial end 158. The second pocket 232 can be radially inward of the second winding loops 186 and can extend axially toward the second axial end 158 such that the second temperature sensor 236 therein can be in close proximity to the second winding loops 186. For example, the second temperature sensor 236 can axially overlap with the second winding loops 186. In the example provided, the second temperature sensor 236 is a thermistor, though other types of sensors can be used. Thus, second pocket 232 and second temperature sensor 236 can be located at a back (e.g., radially inner) plane of the second winding loops 186 such that they are away from the cooling flow, but in strong thermal conduction with the second winding loops 186 to provide accurate temperature readings of the second winding loops 186. The second temperature sensor 236 can be removably coupled to the second pocket 232, such as being threaded into the second pocket 232 for example.

A proximal end of the second outer wall 226 can abut the second axial end 158 of the stator 118. The second outer wall 226 can extend axially from the second axial end 158 of the stator 118 to a distal end of the second outer wall 226. The second outer wall 226 can be coaxial with the axis 146. In the example provided, the second outer wall 226 can be generally parallel to the second inner wall 222. An outward facing cylindrical side of the second outer wall 226 can be disposed radially inward of the fluid channels 174 and an inward facing cylindrical side of the second outer wall 226 can be disposed radially outward of the second winding loops 186.

The second end wall 230 can extend generally radially between the distal end of the second outer wall 226 and the second inner wall 222. In the example provided, the second end wall 230 connects the distal end of the second outer wall 226 to the second inner wall 222 at a location on the second inner wall 222 that is axially between the proximal and distal ends of the second inner wall 222. In the example provided, the second end wall 230 can be generally perpendicular to the axis 146, though other configurations can be used. The second inner wall 222, the second outer wall 226, and the second end wall 230 can cooperate to define a second winding cavity 238 that is disposed annularly about the axis 146 and open toward the stator 118 and configured to receive the second winding loops 186 therein. As such, the second winding cavity 238 can be open to the slots 178 of the stator 118. In the example provided, the second end wall 230 can include one or more second ports 242 that can be open axially through the second end wall 230.

A proximal end of each second pin 234 can be fixedly coupled to the second outer wall 226 and each second pin 234 can extend radially outward from the second outer wall 226 to a distal end. In the example provided, the distal ends of the second pins 234 can be radially outward of a radially innermost part of the openings of the fluid channels 174. In the example provided, the second pins 234 can be equally spaced in the circumferential direction about the second outer wall 226, though other configurations can be used. In the example provided, the second outer wall 226 includes six equally spaced rows of the second pins 234 in the axial direction, though more or fewer rows can be used, or the second pins can be such that they are not arranged in ordered rows. In the example provided, some of the second pins 234 also extend axially outward (i.e., the direction away from the stator 118) from the second end wall 230. In the example provided, the second pins 234 are generally cylindrical or conical in shape, but other configurations can be used, such as fins, ribs, blades, tabs, or pyramid-shapes for example.

Figure 6:
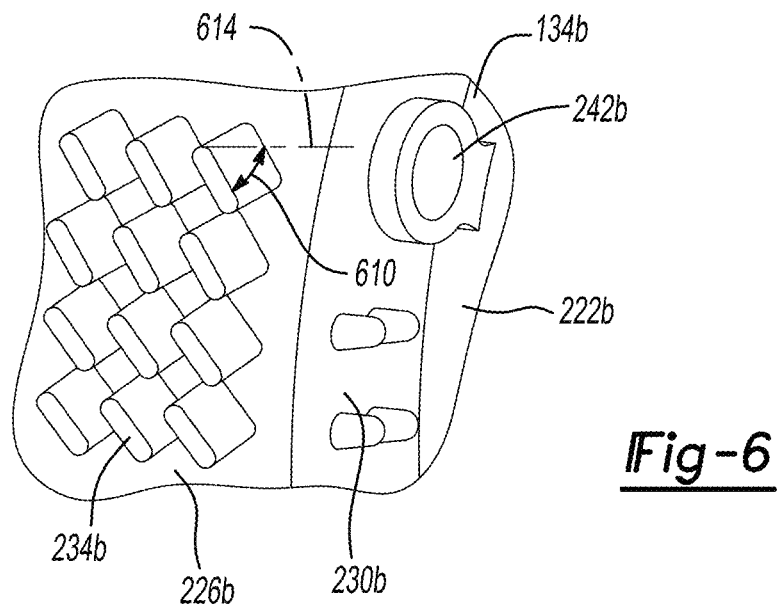
FIG. 6 is a perspective view of a portion of an electric motor of a third construction.

With additional reference to FIG. 6, a portion of a second end cap 134*b* is illustrated with one example of such a different configuration of the second pins 234*b*. The second end cap 134*b* and second pins 234*b* can be similar to the second pins 234 (FIGS. 1 and 3), except as otherwise shown or described herein. Elements of the second end cap 134*b* that are similar to elements of the second end cap 134 (FIGS. 1 and 3) are indicated with similar reference numerals followed by the numeral 'b' and only differences are described in detail herein. In the example shown, the second pins 234*b* have a fin, rib, or blade type shape that are angled to promote uniform rotational flow around the second outer wall 226*b*. In the example provided, the second pins 234*b* can extend longitudinally at an angle 610 relative to the axis 146 (e.g., relative to line 614 which is parallel to the axis 146 shown in FIG. 3). This rotational flow around the second outer wall 226*b* can promote uniform flow to the outlet port 250 (FIG. 3) and can increase heat absorption by the fluid. In the example provided, only the second pins 234*b* have the angled, fin/rib/blade type of pin. In an alternative configuration, not specifically shown, the first end cap 130 (FIGS. 1 and 3) and not the second end cap 134 (FIGS. 1 and 3) can have such angled pins to promote rotational flow. In another alternative configuration, not specifically shown, both the first end cap 130 (FIGS. 1 and 3) and the second end cap 134*b* can have such angled pins to promote rotational flow.

Returning to the example shown in FIGS. 1-3, the second axial end 158 of the stator 118, the inner surface of the housing 114, and the second outer wall 226 can cooperate to define a second chamber or fluid cavity 246 in fluid communication with the fluid channels 174. In the example provided, the second chamber 246 is also defined by the second end wall 230 and the portion of the second inner wall 222 that is axially outward of the second end wall 230, though other configurations can be used. Thus, the second pins 234 can extend within the second chamber 246. In the example provided, the housing 114 defines an outlet port 250 in fluid communication with the second chamber 246.

The second shroud 136 can be similar to the first shroud 132, except as otherwise shown or described herein. The second shroud 136 can be a hollow, generally cylindrical body disposed about the axis 146 and open at both axial ends of the second shroud 136. The second shroud 136 can be fixedly coupled to the stator 118 or the housing 114. The second shroud 136 can be generally between the second end cap 230 and the housing 114 to divide the second chamber 246 into an outer region and an inner region. The inner region can be open to the fluid channels 174, i.e., in direct fluid communication with the fluid channels 174. In other words, fluid flowing from the fluid channels 174 to the outer region must pass through the inner region. A radially inward surface of the second shroud 136 can be in close proximity to the distal ends of the second pins 234 such that fluid flowing through the inner region from the fluid channels 174 is guided across the second pins 234 and maintains a high velocity while passing between the second pins 234.

During assembly of the motor 110, the first end cap 130 can be fixedly mounted to the first axial end 154 of the stator 118 and the second end cap 134 can be fixedly mounted to the second axial end 158 of the stator 118. The slots 178, the first winding cavity 206, and the second winding cavity 238 can then be filled with a thermally conductive, but electrically insulating resin. For example, the resin may be pumped into the first winding cavity 206 via the first ports 210 until the resin fills the first winding cavity 206, the slots 178, and the second winding cavity 238. The resin may then be allowed to harden such that the hardened resin encapsulates the first winding loops 182 and the second winding loops 186, and also contacts the first end cap 130 and the second end cap 134.

Alternatively, the motor 110 may be positioned such that the axis 146 extends in a vertical direction relative to the ground and the first axial end 154 is facing upwards. In this vertical position of the motor 110, the second ports 242 can be sealed and resin may be poured in from the top through the first ports 210 until the resin fills the second winding cavity 238, the slots 178, and the first winding cavity 206. Alternatively, the second ports 242 can be open such that the resin can be pumped in from the bottom through the second ports 242 until the resin fills the second winding cavity 238, the slots 178, and the first winding cavity 206.

The cooling system 138 can include a pump 254 and a heat exchanger 258. The pump 254 can have an outlet coupled to the inlet port 218 for fluid communication therewith such that the pump 254 can pump fluid (e.g., dielectric cooling fluid) to the inlet port 218. The pump 254 can have an inlet coupled to an outlet of the heat exchanger 258 for fluid communication therewith to receive fluid from the heat exchanger 258. The heat exchanger 258 can be any suitable type of heat exchanger configured to release heat 262 to a heat sink (e.g., the atmosphere). The inlet of the heat exchanger 258 can be coupled to the outlet port 250 of the housing 114 to receive fluid therefrom. In an alternative configuration, not specifically shown, the heat exchanger 258 can be in-line between the pump 254 and the inlet port 218 (e.g., the inlet of the heat exchanger 258 can be coupled to the outlet of the pump 254, the outlet of the heat exchanger 258 can be coupled to the inlet port 218, and the inlet of the pump 254 can be coupled to the outlet port 250).

Thus, in operation, the pump 254 can pump cooling fluid through the cooling circuit, such that the fluid flows from the inlet port 218, axially across the first end cap 130 and between the first pins 202 to absorb heat from the first winding loops 182 via the first pins 202. The fluid can then flow into and through the fluid channels 174 to absorb more heat from the stator 118. The fluid can then flow from the fluid channels 174 axially across the second end cap 134 and between the second pins 234 to absorb heat from the second winding loops 186 via the second pins 234. The fluid can then flow through the outlet port 250 to the heat exchanger, where the heat 262 can be transferred from the fluid to a heat sink (e.g., the atmosphere).

Figure 4:
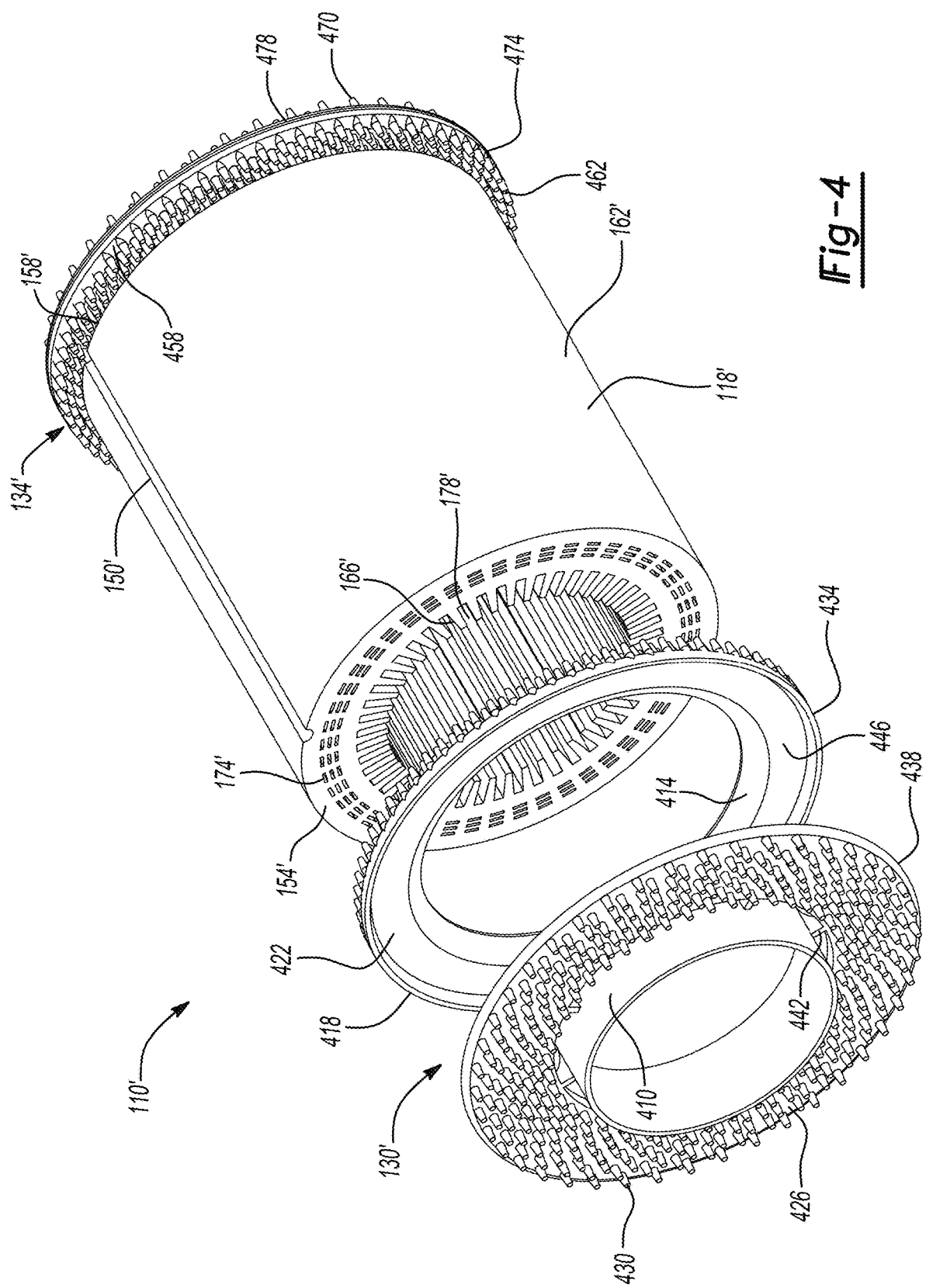
FIG. 4 is a perspective view of a portion of an electric motor of a second construction, constructed in accordance with the teachings of the present disclosure.
Figure 5:
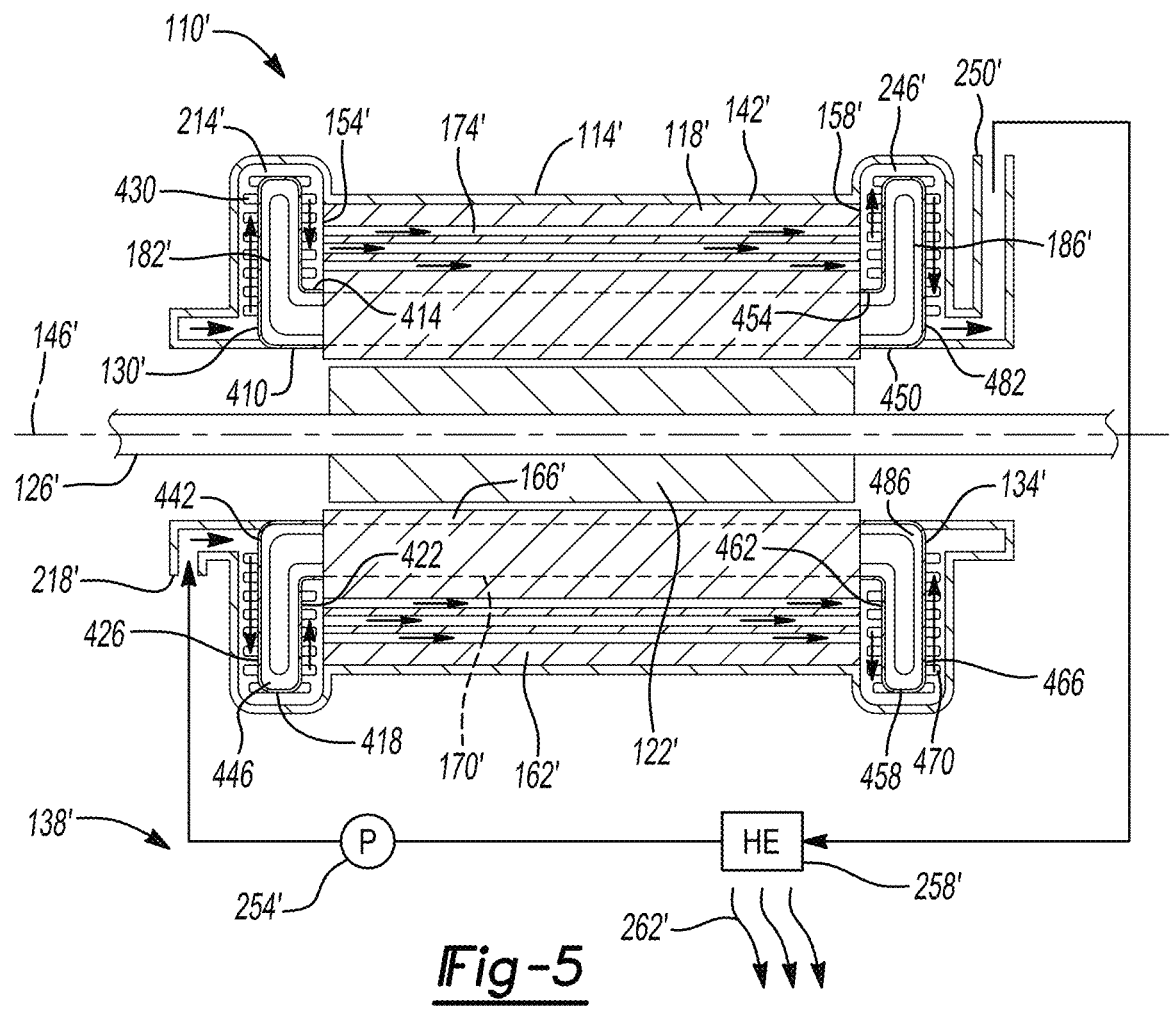
FIG. 5 is a schematic sectional view of a portion of the electric motor of FIG. 4, schematically illustrating a cooling circuit for cooling the electric motor.

With additional reference to FIGS. 4-5, an electric motor 110' of a second construction is illustrated. The electric motor 110' can be similar to the electric motor 110 of FIGS. 1-3 except as otherwise shown or described herein. Elements shown or described herein with primed reference numerals can be similar to those shown and described above with reference to similar non-primed reference numerals except as otherwise shown or described herein. Accordingly, only differences will be described in detail herein. The electric motor 110' can include a housing 114', a stator 118', a rotor 122', an output shaft 126', a first end cap 130', a second end cap 134' and a cooling system 138'. In the example provided, the housing 114' can define a generally cylindrical cavity 142' disposed about an axis 146'. The stator 118' can be disposed about the axis 146' within the cylindrical cavity 142' and can be fixedly coupled to the housing 114' such that the stator 118' is non-rotatable relative to the housing 114'. In the example provided, an outermost cylindrical surface of the stator 118' can include one or more grooves 150' that can extend axially along the stator 118' and can mate with a spline (not specifically shown) on an interior surface of the housing 114', though other configurations can be used. The stator 118' can be formed of a plurality of stator laminations stacked axially end to end along the axis 146', though other configurations can be used.

The stator 118' can be generally annular in shape, with a first axial end 154' and a second axial end 158' opposite the first axial end 154'. The stator 118' can include an annular body 162', a plurality of winding poles 166', and a plurality of wire windings 170'. The annular body 162' can define a plurality of fluid fluid channels 174' that can be open at the first axial end 154' and the second axial end 158' and can extend axially therebetween to permit fluid communication between the first axial end 154' and the second axial end 158'. The fluid channels 174' can be disposed about the axis 146'. In the example provided, the fluid channels 174' are equally spaced apart in the circumferential direction about the axis 146'.

The winding poles 166' can extend radially inward from the radially inward side of the annular body 162'. The winding poles 166' can be equally spaced apart in the circumferential direction about the axis 146' to define winding slots 178' between adjacent ones of the winding poles 166'. Thus, the winding poles 166' and winding slots 178' can be radially inward of the fluid channels 174'. Electrically conductive wire can extend through the winding slots 178' and be wound about the winding poles 166' to form the wire windings 170' in a manner such that a first section of the wire windings 170' forms first winding loops 182' that are axially outward from the first axial end 154' of the stator 118' and a second section of the wire windings 170' forms second winding loops 186' that are axially outward from the second axial end 158' of the stator 118'.

The first winding loops 182' can have a bend such that the first winding loops 182' have a first portion that is proximate to the stator 118' and extends axially outward therefrom, and a second portion that extends radially outward from the first portion. The second portion of the first winding loops 182' can extend radially outward of a radially inward-most part of the fluid channels 174'. In the example provided, the second portion of the first winding loops 182' extends radially outward of a radially outward-most part of the fluid channels 174'.

The second winding loops 186' can have a bend such that the second winding loops 186' have a first portion that is proximate to the stator 118' and extends axially outward therefrom, and a second portion that extends radially outward from the first portion. The second portion of the second winding loops 186' can extend radially outward of a radially inward-most part of the fluid channels 174'. In the example provided, the second portion of the second winding loops 186' extends radially outward of a radially outward-most part of the fluid channels 174'.

The rotor 122' can be disposed about the axis 146' and can be supported for rotation relative to the stator 118'. The stator 118' can be disposed about the rotor 122' such that the rotor 122' is radially inward of the winding poles 166'. The output shaft 126' can be disposed about the axis 146' and fixedly coupled to the rotor 122' for common rotation about the axis 146'. In the example provided, the output shaft 126' can extend axially from both axial ends of the rotor 122'. While not specifically shown, the output shaft 126' can be coupled to a driveline of a vehicle for providing torque to a set of vehicle wheels.

The first end cap 130' can be a generally annular body and can include a first inner wall 410, a pair of first outer walls 414, 418, a pair of first end walls 422, 426, and a plurality of first fins or pins 430. In the example provided, the first end cap 130' is constructed of a unitarily formed first body 434 and a separate, unitarily formed second body 438 that is fixedly coupled to the first body 434 such as by plastic welding for example. The first and second bodies 434, 438 of the first end cap 130' can be formed by any suitable means, such as by injection molding of a plastic for example. The first end cap 130' can be formed from a thermally conductive, but electrically insulating material.

A proximal end of the first inner wall 410 can abut the first axial end 154' of the stator 118'. The first inner wall 410 can extend generally axially from the first axial end 154' of the stator 118' to a distal end of the first inner wall 410. The first inner wall 410 can be coaxial with the axis 146', radially inward of the first winding loops 182' and radially outward of the rotor 122'. A proximal end of the first outer wall 414 can abut the first axial end 154' of the stator 118'. The first outer wall 414 can extend generally axially from the first axial end 154' of the stator 118' to a distal end of the first outer wall 414. The first outer wall 414 can be coaxial with the axis 146', radially outward of the first winding loops 182' and the slots 178', and radially inward of the fluid channels 174'. The distal end of the first outer wall 414 can be axially between the stator 118' and the distal end of the first inner wall 410.

The first end wall 422 can be annular in shape and can extend radially outward from the distal end of the first outer wall 414. In the example provided, the first end wall 422 can extend radially outward of the radially outward-most part of the fluid channels 174' and can extend radially outward of the radially outward-most cylindrical surface of the stator 118'. The first end wall 426 can be annular in shape and can extend radially outward from the first inner wall 410. In the example provided, the first end wall 426 is axially between the first end wall 422 and the distal end of the first inner wall 410 such that the first inner wall 410 extends axially outward of the first end wall 426. In the example provided, the first end wall 426 has an inner diameter that is greater than that of the first inner wall 410 and is fixedly coupled to the first inner wall 410 by a plurality of spokes 442 spaced circumferentially about the axis 146' and extending between the first inner wall 410 and the first end wall 426. The first end wall 426 can extend radially outward of the radially outward-most part of the fluid channels 174' and can extend radially outward of the radially outward-most cylindrical surface of the stator 118'. The first outer wall 418 can extend axially between the radially outward-most parts of the first end walls 422, 426. Accordingly, the first end walls 422, 426, the first inner wall 410, and the first outer walls 414, 418 can cooperate to define a first winding cavity 446 that is disposed annularly about the axis 146' and open toward the stator 118' and configured to receive the first winding loops 182' therein. As such, the first winding cavity 446 can be open to the slots 178' of the stator 118'.

A proximal end of each first pin 430 can be fixedly coupled to the first end wall 422 or the first end wall 426. Each first pin 430 coupled to the first end wall 422 can extend axially inward (i.e., toward the stator 118') from the first end wall 422 to a distal end. Each first pin 430 coupled to the first end wall 426 can extend axially outward (i.e., away from the stator 118') from the first end wall 426 to a distal end. In the example provided, the first pins 430 can be spaced apart to permit fluid to flow between the first pins 430. Thus, the first end cap 130' can have pins extending axially toward and away from the stator 118'. In the example provided, the first pins 430 are generally cylindrical or conical in shape, but other configurations can be used, such as fins, ribs, blades, tabs, or pyramid-shapes for example.

The first axial end 154' of the stator 118', the inner surface of the housing 114', the first outer walls 414, 418, and the first end walls 422, 426 can cooperate to define a first chamber or fluid cavity 214' in fluid communication with the fluid channels 174'. In the example provided, the first chamber 214' is also defined by the portion of the first inner wall 410 that is axially outward of the first end wall 426, though other configurations can be used. Thus, the first pins 430 can extend within the first chamber 214'. In the example provided, the housing 114' defines an inlet port 218' in fluid communication with the first chamber 214'.

The second end cap 134' can be similar to the first end cap 130' except as otherwise shown or described herein. The second end cap 134' can be a generally annular body and can include a second inner wall 450, a pair of second outer walls 454, 458, a pair of second end walls 462, 466, and a plurality of second fins or pins 470. In the example provided, the second end cap 134' is constructed of a unitarily formed third body 474 and a separate, unitarily formed fourth body 478 that is fixedly coupled to the third body 474 such as by plastic welding for example. The third and fourth bodies 474, 478 of the second end cap 134' can be formed by any suitable means, such as by injection molding of a plastic for example. The second end cap 134' can be formed from a thermally conductive, but electrically insulating material.

A proximal end of the second inner wall 450 can abut the second axial end 158' of the stator 118'. The second inner wall 450 can extend generally axially from the second axial end 158' of the stator 118' to a distal end of the second inner wall 450. The second inner wall 450 can be coaxial with the axis 146', radially inward of the second winding loops 186' and radially outward of the rotor 122'. A proximal end of the second outer wall 454 can abut the second axial end 158' of the stator 118'. The second outer wall 454 can extend generally axially from the second axial end 158' of the stator 118' to a distal end of the second outer wall 454. The second outer walls 454 can be coaxial with the axis 146', radially outward of the second winding loops 186' and the slots 178', and radially inward of the fluid channels 174'. The distal end of the second outer wall 454 can be axially between the stator 118' and the distal end of the second inner wall 450.

The second end wall 462 can be annular in shape and can extend radially outward from the distal end of the second outer wall 454. In the example provided, the second end wall 462 can extend radially outward of the radially outward-most part of the fluid channels 174' and can extend radially outward of the radially outward-most cylindrical surface of the stator 118'. The second end wall 466 can be annular in shape and can extend radially outward from the second inner wall 450. In the example provided, the second end wall 466 is axially between the second end wall 462 and the distal end of the second inner wall 450 such that the second inner wall 450 extends axially outward of the second end wall 466. In the example provided, the second end wall 466 has an inner diameter that is greater than that of the second inner wall 450 and is fixedly coupled to the second inner wall 450 by a plurality of spokes 482 spaced circumferentially about the axis 146' and extending between the second inner wall 450 and the second end wall 466. The second end wall 466 can extend radially outward of the radially outward-most part of the fluid channels 174' and can extend radially outward of the radially outward-most cylindrical surface of the stator 118'. The second outer wall 458 can extend axially between the radially outward-most parts of the second end walls 462, 466. Accordingly, the second end walls 462, 466, the second inner wall 450, and the second outer walls 454, 458 can cooperate to define a second winding cavity 486 that is disposed annularly about the axis 146' and open toward the stator 118' and configured to receive the second winding loops 186' therein. As such, the second winding cavity 486 can be open to the slots 178' of the stator 118'.

A proximal end of each second pin 470 can be fixedly coupled to the second end wall 462 or the second end wall 466. Each second pin 470 coupled to the second end wall 462 can extend axially inward (i.e., toward the stator 118') from the second end wall 462 to a distal end. Each second pin 470 coupled to the second end wall 466 can extend axially outward (i.e., away from the stator 118') from the second end wall 466 to a distal end. In the example provided, the second pins 470 can be spaced apart to permit fluid to flow between the second pins 470. Thus, the second end cap 134' can have pins extending axially toward and away from the stator 118'. In the example provided, the second pins 470 are generally cylindrical or conical in shape, but other configurations can be used, such as fins, ribs, blades, tabs, or pyramid-shapes for example.

While not specifically shown, the first pins 430, and/or the second pins 470 can be constructed to promote uniform rotational flow of the fluid around the first and/or second end cap 130', 134', such as being fin, rib, or blade shaped and disposed at prescribed angles similar to those shown in FIG. 6.

Returning to the example provided in FIGS. 4 and 5, the second axial end 158' of the stator 118', the inner surface of the housing 114', the second outer walls 454, 458, and the second end walls 462, 466 can cooperate to define a second chamber or fluid cavity 246' in fluid communication with the fluid channels 174'. In the example provided, the second chamber 246' is also defined by the portion of the second inner wall 450 that is axially outward of the second end wall 466, though other configurations can be used. Thus, the second pins 470 can extend within the second chamber 246'. In the example provided, the housing 114' defines an outlet port 250' in fluid communication with the second chamber 246'.

During assembly of the motor 110', the first end cap 130' can be fixedly mounted to the first axial end 154' of the stator 118' and the second end cap 134' can be fixedly mounted to the second axial end 158' of the stator 118'. The slots 178', the first winding cavity 446, and the second winding cavity 486 can then be filled with a thermally conductive, but electrically insulating resin. For example, the resin may be pumped into the first winding cavity 446 via the gaps between the spokes 442 until the resin fills the first winding cavity 446, the slots 178', and the second winding cavity 486. The resin may then be allowed to harden such that the hardened resin encapsulates the first winding loops 182' and the second winding loops 186', and also contacts the first end cap 130' and the second end cap 134'.

Alternatively, the motor 110' may be positioned such that the axis 146' extends in a vertical direction relative to the ground and the first axial end 154' is facing upwards. In this vertical position of the motor 110', the gaps between the spokes 482 can be sealed and resin may be poured in from the top through the gaps between the spokes 442 until the resin fills the second winding cavity 486, the slots 178', and the first winding cavity 446. Alternatively, the gaps between the spokes 482 can be open such that the resin can be pumped in from the bottom through the gaps between the spokes 482 until the resin fills the second winding cavity 486, the slots 178', and the first winding cavity 446.

The cooling system 138' can include a pump 254' and a heat exchanger 258'. The pump 254' can have an outlet coupled to the inlet port 218' for fluid communication therewith such that the pump 254' can pump fluid (e.g., dielectric cooling fluid) to the inlet port 218'. The pump 254' can have an inlet coupled to an outlet of the heat exchanger 258' for fluid communication therewith to receive fluid from the heat exchanger 258'. The heat exchanger 258' can be any suitable type of heat exchanger configured to release heat 262' to a heat sink (e.g., the atmosphere). The inlet of the heat exchanger 258' can be coupled to the outlet port 250' of the housing 114' to receive fluid therefrom. In an alternative configuration, not specifically shown, the heat exchanger 258' can be in-line between the pump 254' and the inlet port 218' (e.g., the inlet of the heat exchanger 258' can be coupled to the outlet of the pump 254', the outlet of the heat exchanger 258' can be coupled to the inlet port 218', and the inlet of the pump 254' can be coupled to the outlet port 250').

Thus, in operation, the pump 254' can pump cooling fluid through the cooling circuit, such that the fluid flows from the inlet port 218', radially outward across the first end wall 426 and between the first pins 430 thereon to absorb heat from the first winding loops 182 via the first pins 430. The fluid can then flow axially around the first outer wall 418 and radially inward across the first end wall 422 and between the first pins 430 thereon to absorb more heat before entering the fluid channels 174'. The fluid can then flow through the fluid channels 174' to absorb more heat from the stator 118'. The fluid can then flow from the fluid channels 174' radially outward across the second end wall 462 and between the second pins 470 thereon to absorb more heat. The fluid can then flow axially around the second outer wall 458 and radially inward across the second end wall 466 and between the second pins 470 thereon to absorb more heat. The fluid can then flow through the outlet port 250' to the heat exchanger 258', where the heat 262' can be transferred from the fluid to a heat sink (e.g., the atmosphere).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. An electric motor comprising:
   a stator body disposed about an axis and defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body;
a first end cap coupled to the first axial end of the stator body, the first end cap including a first wall and a plurality of first pins, the first wall disposed between the first winding loops and the fluid channels, the first pins extending from a side of the first wall that is opposite the first winding loops;
a housing disposed about the stator body, the housing cooperating with the stator body and the first end cap to define a first chamber in fluid communication with the fluid channels, the first pins extending into the first chamber; and
a shroud disposed about the axis between the first end cap and the housing and configured to guide fluid flow from the first chamber across the first pins to the fluid channels.

2. The electric motor of claim 1, further comprising a pump having an inlet and an outlet, wherein the inlet of the pump is in fluid communication with the first chamber and receives fluid therefrom, or the outlet of the pump is in fluid communication with the first chamber to provide fluid thereto.

3. An electric motor comprising:
a stator body disposed about an axis and defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body;
a first end cap coupled to the first axial end of the stator body, the first end cap including a first wall and a plurality of first pins, the first wall disposed between the first winding loops and the fluid channels, the first pins extending from a side of the first wall that is opposite the first winding loops; and
wherein the first pins extend radially outward from the first wall; and
wherein the first pins extend radially outward of a radially inward-most part of the fluid channels.

4. The electric motor of claim 3, further comprising a second end cap, wherein the plurality of electrically conductive windings form a plurality of second winding loops extending axially outward from the second axial end of the stator body, wherein the second end cap is coupled to the second axial end of the stator body and includes a second wall and a plurality of second pins, the second wall being disposed between the second winding loops and the fluid channels, the second pins extending from a side of the second wall that is opposite the second winding loops, and wherein the second pins extend radially outward from the second wall and extend radially outward of a radially inward-most part of the fluid channels.

5. An electric motor comprising:
a stator body disposed about a longitudinally extending rotational axis of the electric motor and defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body;
a first end cap coupled to the first axial end of the stator body, the first end cap including a first wall that is disposed circumferentially about the first winding loops, the first wall defining a sensor bore that is offset in a radial direction from the first winding loops relative to the rotational axis of the electric motor; and
a sensor received in the sensor bore.

6. An electric motor comprising:
a stator body disposed about an axis and defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body;
a first end cap coupled to the first axial end of the stator body, the first end cap including a first wall and a plurality of first pins, the first wall disposed between the first winding loops and the fluid channels, the first pins extending from a side of the first wall that is opposite the first winding loops; and
wherein the first winding loops extend radially outward of a radially inward-most part of the fluid channels; and
wherein the first wall includes a first annular body and wherein the first pins extend axially from the first annular body in a direction toward the stator body.

7. The electric motor of claim 6, wherein the first winding loops are encased in a thermally conductive but electrically insulating resin that contacts the first wall.

8. The electric motor of claim 6, wherein the first wall includes a second annular body and wherein the first pins extend axially from the second annular body in the direction away from the stator body.

9. The electric motor of claim 6, further comprising a second end cap coupled to the second axial end of the stator body, wherein the plurality of electrically conductive windings form a plurality of second winding loops that extend axially outward from the second axial end of the stator body, wherein a housing cooperates with the stator body and the second end cap to define a second chamber in fluid communication with the fluid channels, wherein the second end cap includes a second wall and a plurality of second pins, the second wall being disposed between the second winding loops and the fluid channels, the second pins extending from a side of the second wall that is opposite the second winding loops, the second pins extending into the second chamber.

10. The electric motor of claim 9, wherein the second wall includes a third annular body, the second pins extending axially from the third annular body in a direction toward the stator body.

11. The electric motor of claim 10, wherein the second wall includes a fourth annular body, wherein the second pins extend axially from the fourth annular body in the direction away from the stator body.

12. The electric motor of claim 9, wherein the second wall includes a third annular body and a fourth annular body coupled to the third annular body to define a second winding cavity, the second winding loops being disposed within the second winding cavity, the second pins extending axially from the second annular body in a direction away from the stator body.

13. An electric motor comprising:
a stator body disposed about an axis and defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body;
a first end cap coupled to the first axial end of the stator body, the first end cap including a first wall and a plurality of first pins, the first wall disposed between the first winding loops and the fluid channels, the first pins extending from a side of the first wall that is opposite the first winding loops; and
wherein the first winding loops extend radially outward of a radially inward-most part of the fluid channels; and
wherein the first wall includes a first annular body and a second annular body coupled to the first annular body to define a first winding cavity, the first winding loops being disposed within the first winding cavity.

14. The electric motor of claim 13, wherein the first winding loops are encased in a thermally conductive but electrically insulating resin that contacts the first wall.

15. The electric motor of claim 13, wherein the first pins extend axially in the direction toward the stator body from the first annular body, or the second annular body in a direction away from the stator body.

16. The electric motor of claim 13, further comprising a second end cap coupled to the second axial end of the stator body, wherein the plurality of electrically conductive windings form a plurality of second winding loops that extend axially outward from the second axial end of the stator body, wherein a housing cooperates with the stator body and the second end cap to define a second chamber in fluid communication with the fluid channels, wherein the second end cap includes a second wall and a plurality of second pins, the second wall being disposed between the second winding loops and the fluid channels, the second pins extending from a side of the second wall that is opposite the second winding loops, the second pins extending into the second chamber.

17. The electric motor of claim 16, wherein the second wall includes a third annular body and a fourth annular body coupled to the third annular body to define a second winding cavity, the second winding loops being disposed within the second winding cavity.

18. The electric motor of claim 17, wherein the second pins extend axially in the direction toward the stator body from the third annular body and axially in the direction away from the stator body from the fourth annular body.

19. The electric motor of claim 16, wherein the second wall includes a third annular body and a fourth annular body coupled to the third annular body to define a second winding cavity, the second winding loops being disposed within the second winding cavity, the second pins extending axially from the second annular body in a direction away from the stator body.

20. An electric motor comprising:
a housing;
a stator body disposed about an axis, the stator body defining a plurality of fluid channels that extend axially through the stator body to provide fluid communication between a first axial end of the stator body and a second axial end of the stator body;
a rotor disposed about the axis and rotatable relative to the stator body;
a plurality of electrically conductive windings forming a plurality of first winding loops extending axially outward from the first axial end of the stator body; and
a first end cap coupled to the first axial end of the stator body, the first end cap including a first wall, the first end cap and the housing defining a first fluid cavity in fluid communication with the fluid channels, the first end cap defining a first winding cavity separated from the first fluid cavity by the first wall, the first winding loops being disposed within the first winding cavity.

21. The electric motor of claim 20, wherein the first end cap includes a plurality of first pins that extend from the first wall into the first fluid cavity, wherein the first pins extend radially outward from the first wall.

22. The electric motor of claim 21, wherein the first pins extend radially outward of a radially inward-most part of the fluid channels.

23. The electric motor of claim 20, wherein the first winding loops are encased in a thermally conductive but electrically insulating resin that contacts the first wall and the first winding loops.

24. The electric motor of claim 20, wherein the first winding loops extend radially outward of a radially inward-most part of the fluid channels.

25. The electric motor of claim 24, wherein the first end cap includes a plurality of first pins that extend from the first wall into the first fluid cavity, wherein the first wall includes a first annular body and a second annular body coupled to the first annular body to define the first winding cavity, the first pins extending axially from at least one of: the first annular body in a direction toward the stator body, and the second annular body in a direction away from the stator body.

* * * * *